United States Patent [19]
Hervig

[11] Patent Number: 5,628,710
[45] Date of Patent: *May 13, 1997

[54] PEDAL AND EXERCISE EQUIPMENT

[76] Inventor: Dana P. Hervig, 1450 102nd St. E., Inver Grove Heights, Minn. 55077

[*] Notice: The term of this patent shall not extend beyond the expiration date of Pat. No. 5,449,332.

[21] Appl. No.: 511,677

[22] Filed: Aug. 7, 1995

Related U.S. Application Data

[63] Continuation-in-part of Ser. No. 311,563, Sep. 23, 1994, Pat. No. 5,449,332.

[51] Int. Cl.$^6$ .............................. A63B 22/06; F16H 7/22
[52] U.S. Cl. .............................................. 482/57; 74/594.4
[58] Field of Search ....................... 482/57, 64; 74/594.4, 74/594.5, 594.6, 594.7

[56] References Cited

U.S. PATENT DOCUMENTS

| | | | |
|---|---|---|---|
| 616,505 | 12/1898 | Sidwell | 74/594.4 |
| 3,834,693 | 9/1974 | Poppenberger . | |
| 4,033,199 | 7/1977 | Bouder | 74/594.5 |
| 4,061,046 | 12/1977 | Lang . | |
| 4,376,532 | 3/1983 | Hunstad . | |
| 4,599,915 | 7/1986 | Hlavoc et al. | 74/594.4 |
| 4,893,523 | 1/1990 | Lennon | 74/594.6 |
| 4,973,046 | 11/1990 | Maxwell . | |
| 5,142,938 | 9/1992 | Sampson . | |
| 5,449,332 | 9/1995 | Hervig | 482/57 |

OTHER PUBLICATIONS

"Pedal Wars", Bike Magazine, vol. 2, No. 2, Apr. 1995, pp. 92–96.

*Primary Examiner*—Stephen R. Crow
*Attorney, Agent, or Firm*—Merchant, Gould, Smith, Edell, Welter & Schmidt P.A.

[57] ABSTRACT

A pedal having a housing having first and second oppositely disposed ends, and support arms extending therefrom between the first and second oppositely disposed ends; rotatable shaft positioned within said housing and having a first end connectable to a crank; and pedal frame pivotally attached to the support arms of the housing. The pedal can be referred to as a rocking pedal since it can provide an unobstructed rocking motion on a heel to toe axis.

12 Claims, 3 Drawing Sheets

PEDAL AND EXERCISE EQUIPMENT

The present application is a continuation-in-part of U.S. patent application Ser. No. 08/311,563, filed Sep. 23, 1994, now U.S. Pat. No. 5,449,332 which issued on Sep. 12, 1995.

BACKGROUND OF THE INVENTION

1. Field of the Invention

The present invention relates to a pedal which can pivot on a heel to toe axis, and can be used with exercise equipment including bicycles and weight lifting equipment.

2. Description of the Prior Art

When conventional pedals are attached to bicycles, they generally provide a pushing surface which remains perpendicular to the plane of the bicycle frame. As a cyclist pedals, the pedal rotates freely about an axis which extends through the pedal from one side of the pedal to another. The principles behind such pedals are described in detail in, for example, U.S. Pat. Nos. 5,142,938 and 4,973,046, which are incorporated herein by reference.

Many cyclists frequently ride several miles at a time. During such a ride, the bicycle crank can rotate several thousands times. As a result, the cyclists' legs sometimes feel wobbly after a long ride. It is believed that this feeling can be at least partly attributed to fatiguing certain leg muscles which are responsible for stabilization. Since the pushing surface of conventional pedals remains perpendicular to the plane of the bicycle frame, different leg muscles are exercised as the leg cycles through a complete rotation. As a result, the strongest muscles are not always used to their capacity, and less used or more easily fatigued muscles are used.

SUMMARY OF THE INVENTION

A pedal which pivots on a heel to toe axis is provided by the present invention. The pedal includes a housing having first and second oppositely disposed ends, and support arms extending therefrom between the first and second oppositely disposed ends; rotatable shaft positioned within the housing and having a first end connectable to a crank; and pedal frame pivotally attached to the support arms of the housing.

The rotatable shaft positioned within the housing freely rotates about an axis which extends through the first and second oppositely disposed ends of said housing. By freely rotating, the shaft can continuously rotate through consecutive revolutions. The pedal frame pivots about an axis which extends through the support arms of said housing. The pivoting movement is relatively unobstructed through a given range of motion, except for resistance forces. Pivot stops which can be provided for limiting the pivoting movement to a predetermined extent or range, such as between about 1 and 24 degrees. The pivoting movement can be provided on a pin extending through each dimples on the pedal frame and through the support arms.

The pedal or the present invention can be described as having a frame which rotates freely about a first axis and pivots about a second axis, wherein the first axis and the second axis are not coaxial. Preferably, they are substantially perpendicular.

"Exercise" includes exertion of the body to acquire dexterity or control. To provide better feel of muscular motion for a cyclist, the present invention increases the allowable range of motion of a rider's feet while cycling. By increasing the amount of motion that can be controlled, more dexterity or muscular control can be developed. Responses to the increased range of motion will activate legs and feet in ways not possible with conventional pedals.

Like swimming, using pedals that freely pivot from side to side can be less stressful because a body can flow to a comfortable position. Swimming is a highly recommended exercise because a body can move through water in a form that is comfortable in a path of least resistance. Hands and feet can freely pivot. Like swimmers in water, cyclists will naturally incline their feet inward or outward while pedaling. The present invention allows inclinations in either direction while pedaling so that a cyclist can develop his or her unique pedaling style.

It is Applicant's discovery that a pedal which freely pivots on a heel to toe axis would provide a more natural pedaling motion and allow a cyclist to gain more utilization of certain muscles. In addition, to feel side to side movement tendencies in pedals and to minimize the movement with feet to develop better muscle control. For example, if a bicycle rider pushes down on a rocking pedal and the left side of his foot rocks inward this indicates that the right side of his foot and corresponding leg muscles need to press into the pedal more to level it. A pedal that rocks to the right would indicate weakness in the user's left side that needs to be overcome to level the pedal. Pedals that rock from side to side would promote biofeedback for the user and allow the development of better coordination.

The pedal can be used on any exercise machine which utilizes pedal power or which provides a cycling motion. Such machines can include bicycles, stationary bicycles, and the like.

DETAILED DESCRIPTION OF THE INVENTION

Figure 1:
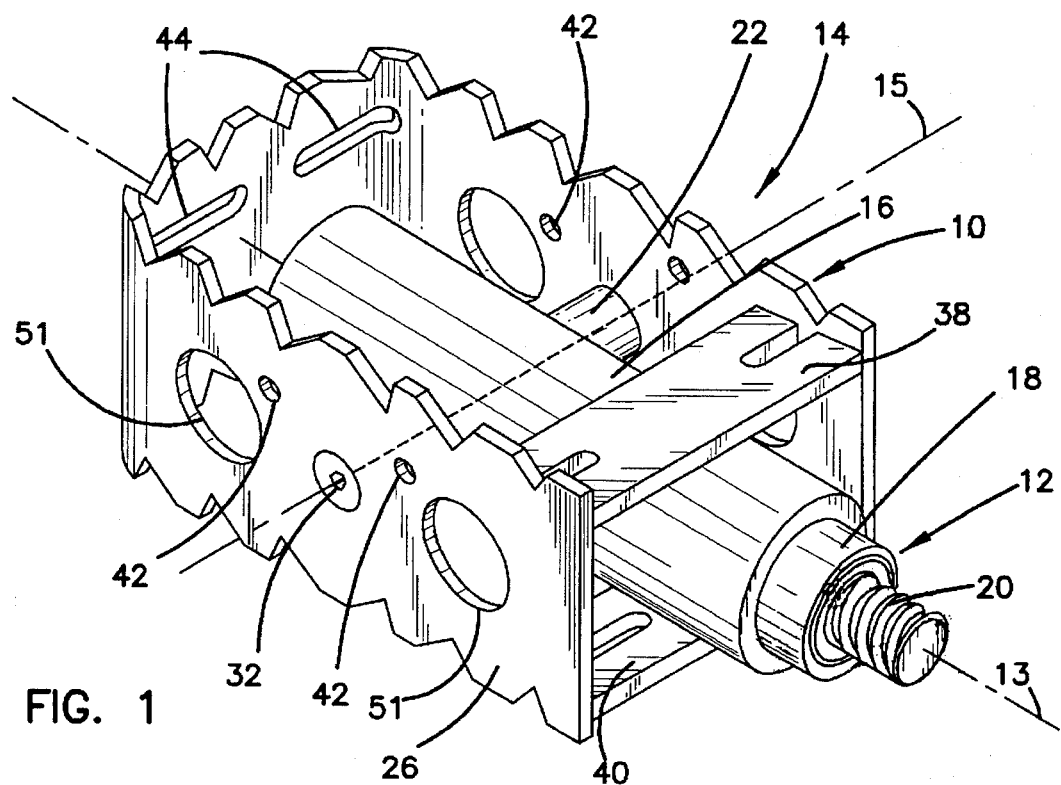
FIG. 1 is a perspective view of a pedal according to principles of the present invention.
Figure 2:
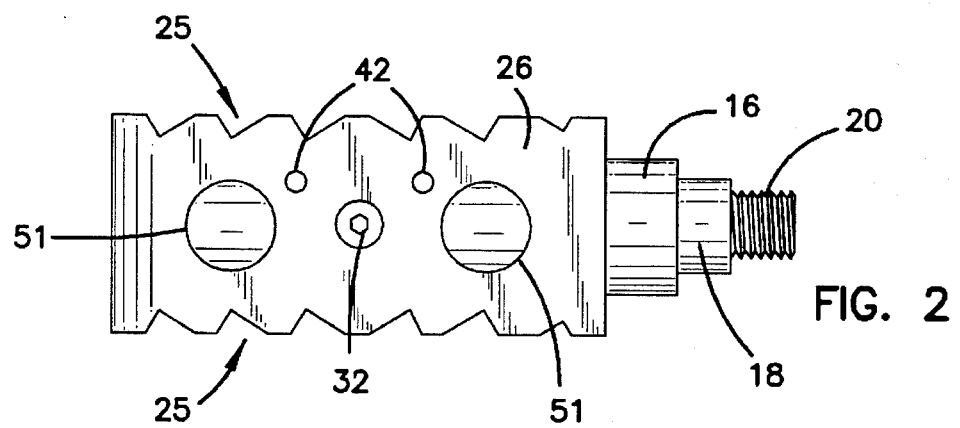
FIG. 2 is a side elevation view of the pedal of FIG. 1.
Figure 4:
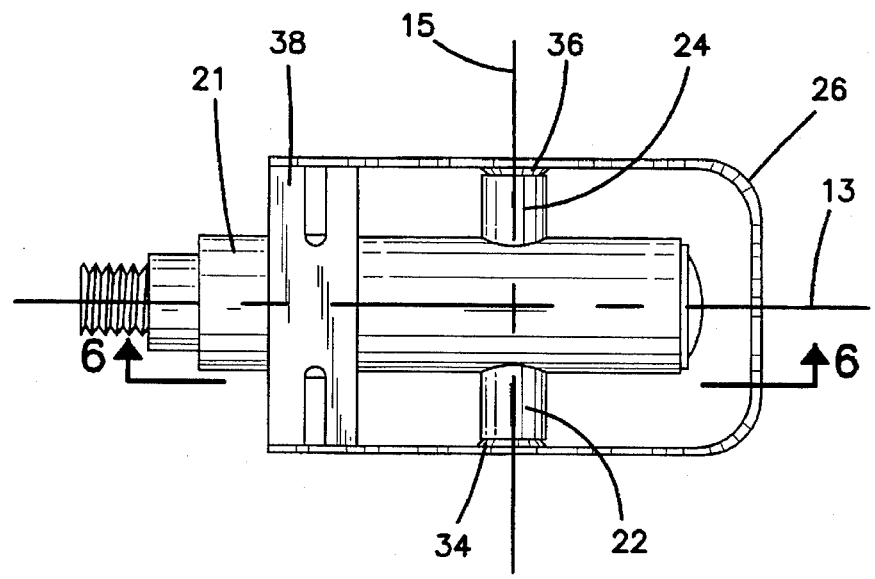
FIG. 4 is a top view of the pedal of FIG. 1.
Figure 3:
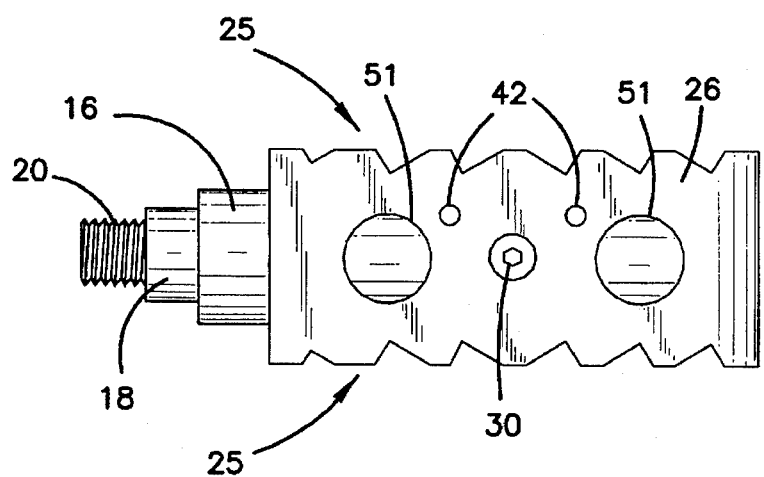
FIG. 3 is a side elevation view of the pedal of FIG. 1.
Figure 5:
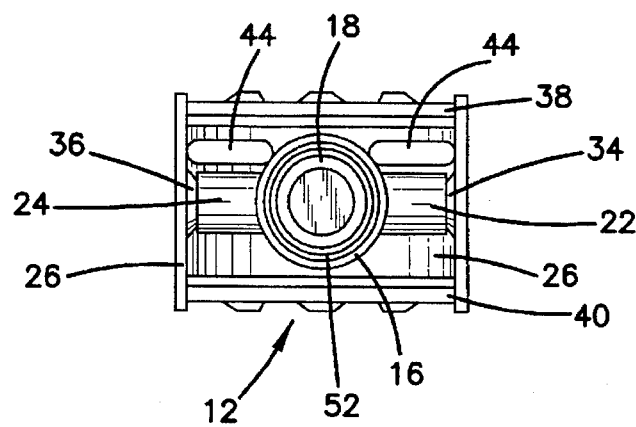
FIG. 5 is an elevation end view of the pedal of FIG. 1.

The preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Referring now to FIGS. 1–7, the reference numeral 10, generally designates an embodiment of the pedal according to the present invention. The pedal 10 may be referred to as a "rocking pedal" and includes a rotational region 12 and a rocking region 14. The rotational region 12 being provided for allowing the pedal 10 to freely rotate about the rotational axis 13 and the rocking region 14 being provided for allowing a rocking action about the heel to toe axis 15. The ability of the pedal to freely rotate about the rotational axis 13 allows the pedal to continuously rotate so that a cyclist's foot can rest on the pushing surface 17 while pedaling. It should be appreciated that the phrase "freely rotates" describes a relationship where the shaft and the housing rotate continuously relative to each other without obstruction other than normal friction. As will be described in more detail, the rocking action allows a cyclist's foot to pivot through a predetermined range of motion to provide desired comfort during pedaling.

The rotational region 12 includes a pedal housing 16 and a shaft 18. The shaft 18 includes a threaded end 20 which is connectable to a bicycle crank. The shaft 18 and the pedal housing 16 can rotate relative to each other on a sliding means such as ball bearings or some similar rotation mechanism which is commonly known in the art and used in the manufacture of bicycle pedals. The rotational relationship between the shaft 18 and the pedal housing 16 is commonly known in the art and can be similar to that provided by ATB pedals by Advent.

The pedal housing 16 incudes support arms 22, 24 which support the pedal frame 26. The pedal housing 16 can be made of any material which provides sufficient structural support and rigidity to be used as a bicycle pedal and hold the pedal frame 26 in place. Exemplary materials which could be used to prepare the pedal housing 16 include aluminum, plastic, and the like. Preferably, the material is injection molded plastic, such as, a mixture of polypropylene and 10% fiberglass, since it provides sufficient structural support and is inexpensive and easy to mold. Although aluminum would be operable within the present invention, it is understood that the labor need to machine aluminum would make it expensive.

An end cap 28 is provided on one end of the housing 16 to keep dirt and moisture out. Once the pedal housing 16 and the shaft 18 are assembled, the end cap 28 is snapped into place.

The support arms 22, 24 extend from the housing 16 and support the pedal frame 26. Bolts 30, 32 are provided to hold the pedal frame 26 to the support arms 22, 24, and provide a heel to toe axis 15 upon which the pedal frame 26 pivots relative to the shaft 18. Nuts are provided in the support arms 22, 24 for receiving the bolts 30, 32. If desired, the bolt and nut arrangement can be replaced with any other fastener which provides sufficient connection and structural support, such as, rivets, pins, and the like.

The pedal frame 26 is stamped from aluminum sheet stock. A saw tooth design 25 is provided for traction. The design is preferably symmetrical on both top and bottom sides so that a foot can pedal from either side. The dimples 34, 36 in the pedal frame 26 are provided to engage the support arms 22, 24. In addition, the dimples 34, 36 allow the bolts 30, 32 to be recessed so they do not extend beyond the outer surface of the pedal frame 26. In addition, the dimples 34, 36 can form a bearing surface against the support arms 22, 24.

Figure 7:
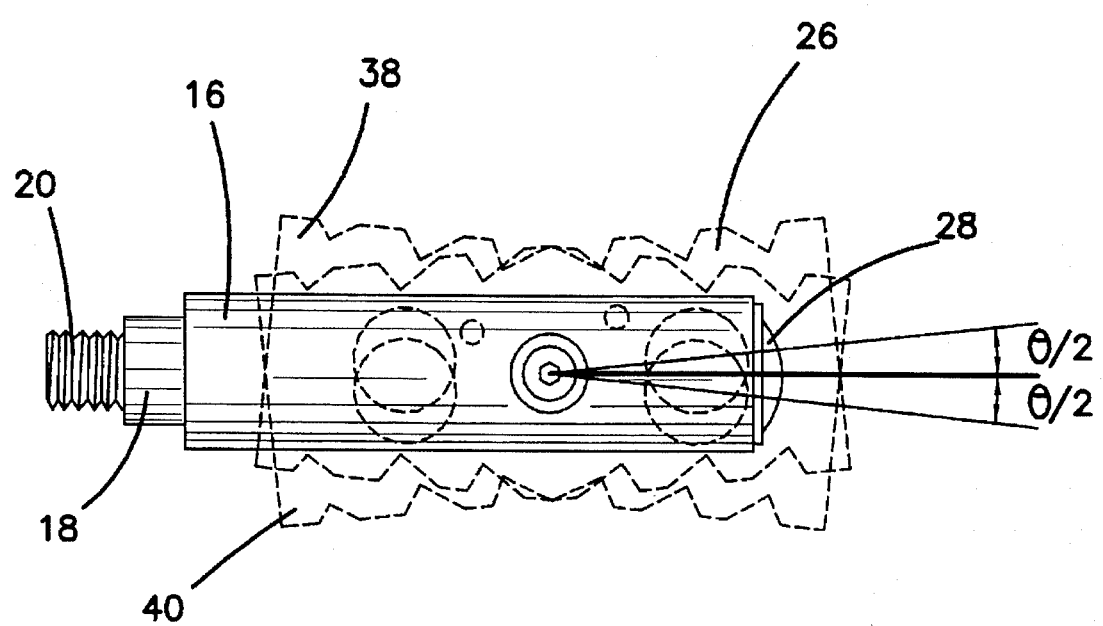
FIG. 7 is a side view of the pedal of FIG. 1 showing the pivoting action of the pedal frame.
Figure 6:
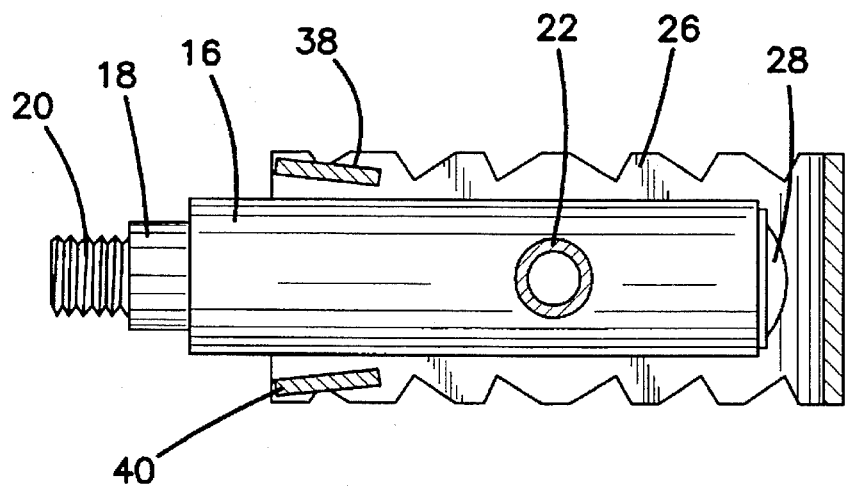
FIG. 6 is a sectional view of the pedal of FIG. 4 taken along line 6—6.

The pedal frame 26 includes pivot stops 38, 40 which limit the pivot action to a predetermined extent. Of course, the angle or pivot action can be adjusted to provide the desired degree of pivot by adjusting the location of the stops 38, 40 or by adjusting the distance between the stops 38, 40. As shown in FIG. 7, the pivot stop 38 engages the housing 16 when the pedal frame 26 is fully pivoted to one side, and pivot stop 40 engages the housing 16 when the pedal frame is fully pivoted to the other side. Thus, by adjusting the pivot stops 38, 40, the angle θ can be increased or decreased. The angle θ reflects the full range of movement the pedal frame 26 can pivot. It should be understood that the pivot action is relatively unobstructed within the range of angle θ. Friction at bearing surfaces provides the resistance to the pivot action. The range of angle θ is selected in order to provide sufficient pivot action but should not be too large which may result in overstretching or injury. Factors which may influence the selection of the range of angle θ include comfort, biofeedback, safety, and the like. Preferably, the range of angle θ is in the range of about 8 to 12 degrees, and more preferably in the range of 10 to 14 degrees.

The pedal frame 26 includes pedal cage holes 42 which provide for installation of a pedal cage. Straps for the pedal cage can wrap through the strap openings 44. One skilled in the art would readily appreciate how pedal cage straps can be fed through the strap openings 44.

The following example describes a preferred method for preparing the pedal 10. The steps described are provided in order to describe, in detail, how the pedal 10 can be prepared and are not intended to limit the scope of the invention.

EXAMPLE—MANUFACTURING AND ASSEMBLING THE PEDAL

A plastic composition of polypropylene and 10% fiberglass is molded by injection molding to form the housing 16 which is hollow through the center. Once the housing is prepared, commercially available components are inserted thereon. These include two sets of ball bearings (ten ball bearings per set), two stamped metal bearing cups, a bearing nut, a washer, and a lock nut. The pedal shaft 18 has a threaded end 20 which is adapted for insertion into a bicycle crank and an opposite threaded end for a bearing nut to hold the housing and the bearings in place. The housing has an adaption end 21 which fits near the threaded end 20 of the shaft 18. Each bearing cup 52 is press fit, convex side first, into both ends of the housing. The cups have holes in the centers of each to allow the shaft to pass through the shaft housing. A first set of bearings is inserted into the cup in the adaptation end of housing. The shaft 18 should be partially inserted into the housing 16 before the ball bearings are inserted. After a set of bearings is placed in the adaptation end 21 of the housing 16, the shaft 18 can be inserted the rest of the way into housing 16 to hold the bearings inside. The first set of bearings is held in place between a beveled ridge on the threaded end 20 of the shaft 18 and the bearing cup. While holding the shaft 18 firmly inside of the housing 16 so that the first set of bearings does not fall out, a second set of bearings is placed into the concave side of the opposite cup. A bearing nut, having a smooth beveled side, is threaded beveled side first onto the opposite shaft end and is tightened to seat both sets of bearings. The outer diameter of the bearing nut, like the beveled ridge of the shaft, is slightly smaller than the inside of the cup so that the ball bearings are held inside the cup and cannot roll out. The bearing nut is adjusted by backing it off about a quarter turn so that the shaft 18 will spin freely, but not too loosely, inside housing 16. A washer is inserted behind the bearing nut and a lock nut is threaded and tightened against the washer to hold the bearing nut in place. The end cap 28 is press fit into the housing 16 to keep dirt and moisture out of the bearings.

Included in the molding of housing 16 are two housing arms 22, 24 that extend from opposite sides of the housing. The arms 22, 24 extend substantially perpendicular to the rotational axis 13. Preferably, the shaft 18 is sufficiently long so that arms 22, 24 can be positioned thereover. To allow foot clearance from a bicycle crank (not shown), the arms 22, 24 are positioned on the housing 16 so that the heel to toe axis 15 is about three inches from the crank. Each of the arms has a commercially available threaded brass nut insert (not shown) designed for use with thermoplastics. The brass nut inserts are threaded onto alignment screws in the mold before it fills with hot plastic. The mold uses alignment screws to position the inserts and keep the inserts from filling up with plastic during molding. After the housing 16 is removed from the mold and has started to cool the alignment screws are removed from the inserts. The finished housing 16 contains two threaded inserts with openings along the heel to toe axis 15 on which the pedal frame 26 can be installed.

The pedal frame 26 is stamped from 0.125 inch 5052 H-32 aluminum sheet stock with a 0.030 radius on all corners using a metal stamping die. The frame 22 is blanked from the sheet stock to have the following features: proper length, width, tread design, embossed dimples 34, 36, holes for mounting to the arms 42 for mounting to the arms, holes 51 to lighten the frame, holes 42 to mount a pedal cage, and slots 44 for pedal cage straps. The frame is bent from a flat piece using a forming die to provide a U-shape. The frame pivot stops 38, 40 are flat pieces that are also stamped from 0.125 inch 5052 H-32 aluminum sheet stock with a 0.030 radius on all corners. The pedal frame 26 and the frame pivot stops 38, 40 are tumbled in a vat with ceramic stones to remove any sharp burrs from the stamping process. After they are cleaned, the frame pivot stops 38, 40 are welded to the frame 26. Preferably, the pedal frame will pivot approximately six degrees to either side.

After the pedal frame 26 is welded together with the pivot stops 38, 40, it is dipped in a metal etching solution and anodized to a chosen color. The frame 26 is then ready to be attached to arms 22, 24. The frame 26 is positioned so that the holes inside dimples 34, 36 are over the holes formed by the brass inserts in the ends of arms 22, 24. Bolts 30, 32 are then inserted in each of the two holes and lightly tightened so that a bearing surface formed by the dimples 34, 36 in the pedal frame 26 will pivot on the bolts. A pedal cage with straps can be used to hold a rider's foot in place.

While the invention has been described in conjunction with a specific embodiment thereof, it is evident that different alternatives, modifications, variations, and uses will be apparent to those skilled in the art in view of the foregoing description. Accordingly, the invention is not limited to these embodiments or the use of elements having specific configurations and shapes as presented herein.

What is claimed is:

1. A pedal comprising:
   (a) housing having first and second oppositely disposed ends, and support arms extending orthogonally therefrom between the first and second oppositely disposed ends;
   (b) rotatable shaft positioned coaxially within said housing and having a first end connectable to a crank;
   (c) pedal frame pivotally attached to the support arms of said housing to provide rotation about the support arms.

2. The pedal according to claim 1, wherein said rotatable shaft positioned within said housing rotates about an axis which extends through the first and second oppositely disposed ends of said housing.

3. The pedal according to claim 1, wherein said pedal frame pivots about an axis which extends through the support arms of said housing.

4. The pedal according to claim 1, wherein said pedal frame further comprises pivot stops which limit pivoting movement thereof to a predetermined extent.

5. The pedal according to claim 4, wherein the pivoting movement is between about 1 and 24 degrees.

6. The pedal according to claim 1, wherein said pedal frame further comprises openings for attaching a toe clip.

7. The pedal according to claim 1, wherein said pedal frame further comprises a top contact surface and a bottom contact surface.

8. The pedal according to claim 1, wherein said pedal frame includes dimples which flare inward and engage the support arms.

9. An exercise machine comprising at least one pedal; said pedal comprising:
   (a) housing having first and second oppositely disposed ends, and support arms extending orthogonally therefrom between the first and second oppositely disposed ends;
   (b) rotatable shaft positioned coaxially within said housing and having a first end connectable to a bicycle crank;
   (c) pedal frame pivotally attached to the support arms of said housing to provide rotation about the support arms.

10. The exercise machine according to claim 9, which is a bicycle.

11. The exercise machine according to claim 9, which is a stationary bicycle.

12. A pedal comprising:
   (a) a housing having first and second oppositely disposed ends, and two support arms extending orthogonally therefrom between the first and second oppositely disposed ends;
   (b) rotatable shaft positioned coaxially within said housing and having a first end connectable to a crank;
   (c) pedal frame; and
   (d) pins for attaching said pedal frame to the two support arms; the pins providing an axis about which the pedal frame can rotate.

* * * * *

UNITED STATES PATENT AND TRADEMARK OFFICE
CERTIFICATE OF CORRECTION

PATENT NO. : 5,628,710

DATED : May 13, 1997

INVENTOR(S) : Hervig

It is certified that error appears in the above-indentified patent and that said Letters Patent is hereby corrected as shown below:

Column 5, Line 14, delete the second occurrence of "for mounting to the arms".

Signed and Sealed this

Fourth Day of November, 1997

Attest:

BRUCE LEHMAN

Attesting Officer

Commissioner of Patents and Trademarks